United States Patent
Thakolsri et al.

(10) Patent No.: US 8,908,512 B2
(45) Date of Patent: Dec. 9, 2014

(54) METHOD AND APPARATUS RATE SHAPING

(75) Inventors: Srisakul Thakolsri, Munich (DE); Wolfgang Kellerer, Furstenfeldbruck (DE); Eckehard Steinbach, Olching (DE)

(73) Assignee: NTT DoCoMo, Inc., Tokyo (JP)

( * ) Notice: Subject to any disclaimer, the term of this patent is extended or adjusted under 35 U.S.C. 154(b) by 709 days.

(21) Appl. No.: 12/932,159

(22) Filed: Feb. 18, 2011

(65) Prior Publication Data
US 2011/0211650 A1  Sep. 1, 2011

(30) Foreign Application Priority Data
Feb. 25, 2010 (EP) .................................... 10154660

(51) Int. Cl.
| | | |
|---|---|---|
| G08C 15/04 | (2006.01) | |
| H04N 21/2343 | (2011.01) | |
| H04L 29/06 | (2006.01) | |
| H04N 21/24 | (2011.01) | |
| H04N 19/40 | (2014.01) | |
| H04N 21/2365 | (2011.01) | |

(52) U.S. Cl.
CPC ...... *H04L 65/602* (2013.01); *H04N 21/234327* (2013.01); *H04N 21/2402* (2013.01); *H04N 21/234309* (2013.01); *H04L 65/80* (2013.01); *H04N 19/00472* (2013.01); *H04N 21/23655* (2013.01)
USPC ....................................... 370/230.1; 370/252

(58) Field of Classification Search
CPC .............. H04L 29/06027; H04L 65/1069; H04L 65/1083; H04L 65/4007; H04L 65/607; H04L 47/10; H04L 65/605; H04L 69/04; H04L 67/2819; H04L 67/2823; H04N 19/0009; H04N 19/00175; H04N 19/00387; H04N 19/00406; H04N 19/00418; H04N 19/0047; H04N 21/2343; H04N 21/2662; H04N 19/00096; H04N 19/00127; H04N 19/00751
USPC .............. 370/229, 230, 230.1, 231–236, 241, 370/252, 255, 329, 333, 431, 437, 464, 465, 370/543–545
See application file for complete search history.

(56) References Cited

U.S. PATENT DOCUMENTS

| | | | |
|---|---|---|---|
| 6,490,320 B1 * | 12/2002 | Vetro et al. | 375/240.08 |
| 2007/0177519 A1 * | 8/2007 | Thomsen | 370/252 |

(Continued)

OTHER PUBLICATIONS

European Search Report, Aug. 5, 2010.

(Continued)

*Primary Examiner* — Kevin C Harper
*Assistant Examiner* — Mon Cheri Davenport
(74) *Attorney, Agent, or Firm* — Nutter McClennen & Fish LLP; John J. Penny, V (57) ABSTRACT

A method is provided for performing a rate shaping of multiple data streams which are to be transmitted through a network. The network has the capability to perform a rate shaping using a first rate shaping scheme and at least one other rate shaping scheme other than said first rate shaping scheme. The method can include determining based on the resources of the network the maximum number n of data streams for which said first rate shaping scheme can be applied as a rate shaping scheme, selecting n data streams among the multiple data streams which are to be transmitted and performing a transcoding on them to perform a rate shaping, and performing a rate shaping for other data streams using a different rate shaping scheme other than said first rate shaping scheme.

12 Claims, 8 Drawing Sheets

(56) References Cited

U.S. PATENT DOCUMENTS

2008/0002577 A1* 1/2008 Bapat et al. .................. 370/230
2011/0013709 A1* 1/2011 Lu et al. ........................ 375/260

OTHER PUBLICATIONS

Srisakul Thakolsri et al., "Application-Driven Cross Layer Optimization for Wireless Networks Using MOS-based Utility Functions," Communiations and Networking in China, 2009, CHINACOM 2009, pp. 1-5, Fourth International Conference on, IEEE, Piscataway, NJ, USA, Aug. 26, 2009.

Delfosse E et al., "Optimal Adaptation Decision-Taking for Terminal and Network Quality-of-Service," IEEE Transactions on Multimedia, IEEE Service Center, Piscataway, NJ, US LNKDDOI: 10.1109/TMM.2005.846798, pp. 454-462, vol. 7, No. 3, Jun. 1, 2005.

Ying Li et al., "Content-Aware Distortion-Fair Video Streaming in Congested Networks," IEEE Transactions on Multimedial, IEEE Service Center, Piscataway, NJ, US LNKDDOI: 10.1109/TMM.2009.2026102, pp. 1182-1193, vol. 11, No. 6, Oct. 1, 2009.

Jae-Gon Kim et al., "Content-Adaptive Utility-Based Video Adaptation," Proceedings of the 2003 International Conference on Multimedia and Expo: Jul. 6-9, 2003, pp. 281-284, Baltimore Marriott Waterfront Hotel, Baltimore, Maryland, USA, IEEE Operations Center, US, vol. 3, Jul. 6, 2003.

* cited by examiner

METHOD AND APPARATUS RATE SHAPING

FIELD OF INVENTION

The present invention relates to a method and an apparatus for performing a rate shaping of multiple data streams which are to be transmitted through a network.

BACKGROUND OF THE INVENTION

As internet video communication moves rapidly into the commercial realm, it is expected that video applications will become popular in mobile networks. Though the mobile networks are improving with higher bandwidth and lower transmission delay, they remain limited due to a high demand of video communication. Therefore, optimizing the network resource allocation and adapting the application data rate in the network becomes a priority for the network operator. There are several existing approaches to adapt the application data rate in a network, one being the so-called "transcoding", one being the "packet dropping", and another one being an approach called "layer dropping".

An approach which is based on transcoding is e.g. disclosed in US-Patent Application 2008/0205389 A1. It discloses a policy engine which manages processing constraints of the media processing units to determine the best combination of transcoding processes in order to provide the highest quality transmissions without overloading the processing capacity of the host computer.

An approach which is based on packet dropping is e.g. disclosed in US-Patent Application 2008/0259799 A1, and an approach which is based on layer dropping is e.g. disclosed in US-Patent Application 2008/0122878 A1.

It has, however, so far not been tried to develop an integrated rate shaping mechanism which takes into account more than one different rate shaping scheme in order to improve video quality.

SUMMARY OF THE INVENTION

According to one embodiment there is provided a method for performing a rate shaping of multiple data streams which are to be transmitted through a network, said network having the capability to perform a rate shaping using a first rate shaping scheme and at least one other rate shaping scheme other than said first rate shaping scheme, wherein said first rate shaping scheme is a transcoding scheme and has a smaller impact on the quality of the data stream than said at least one other rate shaping scheme but requires more computational resources than said at least one other rate shaping scheme, said method comprising:
determining based on the available computational resources of the network the maximum number n of data streams for which said first rate shaping scheme can be applied as a rate shaping scheme;
selecting n data streams among the multiple data streams which are to be transmitted and performing a transcoding on them to perform a rate shaping;
performing a rate shaping for other data streams using a different rate shaping scheme other than said first rate shaping scheme.

By performing the rate shaping according to a selection of different rate shaping schemes based on their respective impact on quality, the present invention enables an adaptation to not only to the computational resources available but simultaneously enables an optimization of the impact on quality by the performed selection.

According to one embodiment the method further comprises:
determining for each of said multiple data streams a measure indicating how much the quality is degraded when the bit rate is changed based on the at least one other rate shaping scheme;
selecting the n data streams for which said measure indicates the largest quality degradation as the ones for which the first rate shaping scheme is to be applied, and
applying said at least one other rate shaping scheme to the remaining data streams of said multiple data streams.

In this manner there is performed a clever selection of the individual data streams for which the "best" rate shaping scheme is applied, namely by selecting the ones for which the other rate shaping scheme(s) would lead to a particularly bad result. In this manner a highly efficient quality optimization can be achieved.

According to one embodiment said measure indicating said quality degradation is determined in advance before the data stream is to be sent through said network, and
said measure indicating said quality degradation is sent to said network together with said data stream to enable said network to select the appropriate rate shaping scheme for the individual data streams based thereon.

In this manner the mechanism for selection can rely on available parameters on the quality impact to perform the selection in a fast and efficient manner.

According to one embodiment if more than one rate shaping schemes other than said first rate shaping scheme are available in said network, said method comprises:
determining for each of said multiple data streams a measure indicating how much the quality is degraded when the bit rate is respectively changed based on each of the more than one other rate shaping schemes; and
for those data streams which are not selected for the first rate shaping scheme to be applied, selecting the rate shaping scheme among the more than one other rate shaping schemes based on their corresponding impact on the quality of the data streams such as to minimize said impact.

In this manner a situation can be dealt with where there are more than one "other" rate shaping schemes in addition to the best one, while still an optimum result in overall quality is achieved.

According to one embodiment
said other rate shaping schemes comprise one or more of the following:
packet dropping;
layer dropping, and/or wherein
said data streams are video data streams.

In this manner the mechanism can be applied to existing environments with already established rate shaping schemes.

According to one embodiment said measure of said quality degradation is the gradient of a quality measure versus the bitrate or versus the fraction of resource allocation.

This provides a particularly good and convenient measure of the impact of selecting a certain rate shaping scheme on quality.

According to one embodiment said network stores a quality model indicating how much the quality of a certain data stream is degraded if a certain rate shaping scheme is applied, and the selection of the rate shaping scheme for a certain data stream is based on said quality model stored in said network.

In this manner an existing (core) network can be adapted to perform the rate shaping scheme according to embodiments of the invention.

According to one embodiment there is provided an apparatus for performing a rate shaping of multiple data streams which are to be transmitted through a network, said network having the capability to perform a rate shaping using a first rate shaping scheme and at least one other rate shaping scheme other than said first rate shaping scheme, wherein said first rate shaping scheme is a transcoding scheme and has a smaller impact on the quality of the data stream than said at least one other rate shaping scheme but requires more computational resources than said at least one other rate shaping scheme, said apparatus comprising:

a module for determining based on the available computational resources of the network the maximum number n of data streams for which said first rate shaping scheme can be applied as a rate shaping scheme;

a module for selecting n data streams among the multiple data streams which are to be transmitted and performing a transcoding on them to perform a rate shaping;

a module for performing a rate shaping for other data streams using a different rate shaping scheme other than said first rate shaping scheme.

According to one embodiment the apparatus further comprises:

a module for determining for each of said multiple data streams a measure indicating how much the quality is degraded when the bit rate is changed based on the at least one other rate shaping scheme;

a module for selecting the n data streams for which said measure indicates the largest quality degradation as the ones for which the first rate shaping scheme is to be applied, and a module for applying said at least one other rate shaping scheme to the remaining data streams of said multiple data streams.

According to one embodiment said apparatus comprises:

a module for, if more than one rate shaping schemes other than said first rate shaping scheme are available in said network, determining for each of said multiple data streams a measure indicating how much the quality is degraded when the bit rate is respectively changed based on each of the more than one other rate shaping schemes; and a module for selecting, for those data streams which are not selected for the first rate shaping scheme to be applied, the rate shaping scheme among the more than one other rate shaping schemes based on their corresponding impact on the quality of the data streams such as to minimize said impact.

According to one embodiment there is provided a computer program comprising computer program code which when being executed on a computer enables said computer to carry out a method according to one of the embodiments of the invention.

DETAILED DESCRIPTION

The present invention will now be described by means of exemplary embodiments.

According to one embodiment, the rate shaping which is performed to apply a data rate adaptation in the network uses more than one rate shaping schemes and performs a selection of the rate shaping schemes which are actually applied to different video streams such that the negative impact of the rate shaping on the overall quality is minimized. In one embodiment the rate shaping actually applied and selected is based on a comparison of the impact of different available rate shaping schemes to the human perceived quality, and this information is then used to select an appropriate scheme to improve the overall video quality perceived by the users served by the network.

According to one embodiment, for example, transcoding is available as a first rate shaping scheme, and in addition to transcoding also one or more other rate shaping schemes different from transcoding are available (e.g. packet dropping or layer dropping) for rate shaping. Furthermore, the first rate shaping scheme (e.g. transcoding) requires higher computational efforts than the other rate shaping scheme or schemes, and the first rate shaping scheme at the same time has less impact on the quality than the other rate shaping scheme. Then it is decided based on the impact which these rate shaping schemes is used for which of the video streams to be transmitted through the network such that the overall quality is optimized. According to one embodiment the first rate shaping scheme may be transcoding, while the second (or other) rate shaping scheme is a scheme different from transcoding. Such other rate shaping schemes different from transcoding may e.g. be packet dropping or layer dropping.

It should be noted here that if "different rate shaping schemes" are mentioned, then this is to be understood such that this does not refer to a modification of e.g. parameters of one and the same rate shaping scheme (like e.g. transcoding) but instead refers to a rate shaping schemes which are different in their technical approach or algorithm as to how the rate shaping is to be performed, such as e.g. transcoding is with respect to the underlying algorithm different from layer dropping or packet dropping.

Figure 1:
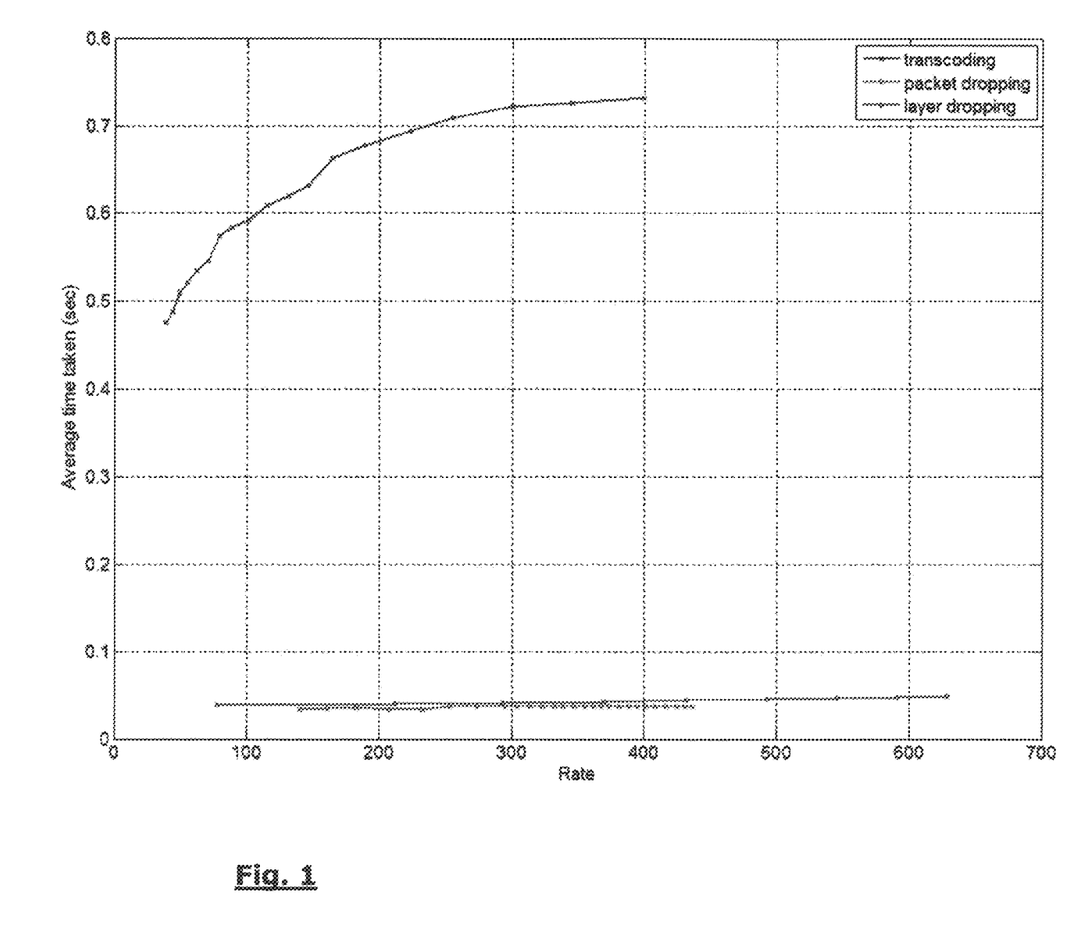
FIG. 1 schematically illustrates the computation time necessary for different rate shaping schemes.

Now the different impacts of the multiple different rate shaping schemes will be explained in somewhat more detail. As mentioned, the different rate shaping schemes also require different computational resources (e.g. CPU time). This is for example illustrated in FIG. 1 which shows that transcoding an exemplary video to a different data rate takes much more computational resources (as measured by time consumption) compared to the packet dropping approach and the layer dropping approach. In FIG. 1 the computation time for transcoding for transcoding a stream is shown as the graph starting at about 0.46 sec (for a bit rate of about 4 kbps) and rising up to a computation time of about 0.73 sec (for a bit rate of about 400 kbps). On the other hand, as can be seen from FIG. 1 the computation time for the packet dropping scheme remains almost the same (at about 0.03 sec) for a bitrate from about 70 kbps to about 640 kbps. Similarly, for the layer dropping scheme the computation time remains about constant at about 0.025 sec for bitrates from about 140 kbps to about 440 kbps.

Due to the large computation time necessary for transcoding, the network may not be able to perform a transcoding for all video data streams served by the network. According to one embodiment therefore the lower computational requirements for (one or more) other rate shaping schemes (such as packet dropping or layer dropping) may be used by selecting these schemes for some of the video streams.

According to one embodiment there is performed a selection of the video streams for which the "first rate shaping scheme" is to be applied, which is the rate shaping scheme having the least impact on the quality. The selection is performed such that based on the available computational resources it is determined for how many video streams the first rate shaping scheme may be applied, and the corresponding number of streams is then selected for applying the first rate shaping scheme (e.g. transcoding). For the remaining video streams then the one or more other rate shaping schemes are selected for application. In this way there can be applied a selection such that the quality is optimized based on the available resources as well as based on the impact on quality by selecting as many video streams as possible (given the available resources) for applying the first rate shaping scheme which has the least impact on quality.

This selection, according to one embodiment, can be further improved by taking into account the impact on quality when selecting the data streams for which the first rate shaping scheme is to be applied. For that purpose there will be considered the impact which the other rate shaping schemes—other than the "good" first rate shaping scheme—will have on the quality of the different video streams. There may be used some indicator which indicates for each individual video stream the impact which a certain rate shaping scheme would have on the quality of this video stream. This information on quality impact can then be used such that there are selected those video streams for applying the first ("best") rate shaping scheme on which the selection of another rate shaping scheme would have a particularly bad impact. In other words, those video streams are selected for applying the first rate shaping scheme for which the quality degradation would be highest if another rate shaping scheme than said first rate shaping scheme would be applied.

According to one embodiment therefore there is performed an "optimized selection" as to which rate shaping scheme is to be applied, and this selection is not only based on the available computational resources but also on the impact which the different rate shaping schemes have on the quality of the video streams. There is selected a rate shaping scheme to be applied for the video stream under the constraint of available computational resources and in view of the impact on quality. For example, if the network could offer the resources to transcode 3 video streams at maximum simultaneously, there will then be selected the three video streams to be transcoded, which have the most impact to video quality when performing the other available rate shaping scheme (such as packet dropping). In somewhat more detail, for example, the algorithm calculates (for each video stream to be transmitted) the gradient video quality with respect to the data rate when performing rate shaping by the "other" rate shaping scheme (here the packet dropping). A higher gradient then means that the video is more sensitive to the packet dropping, and therefore, the optimized selection is performed such that for the video having the highest gradient a transcoding (first rate shaping scheme) is performed instead of packet dropping. In this way the three video streams having the highest gradients are selected for transcoding, and for the remaining video streams then the packed dropping is performed which then has less impact on the overall quality than if one of the three video streams with the highest gradients would have been selected for packet dropping.

Embodiments of the invention may be applied for example in the scenario, where the network is congested due to a high demand of video data streams and the network has a limited computational resources for transcoding a certain number of video streams simultaneously. In order to efficiently allocate a network resource and to reduce a network load while maximizing an overall user satisfaction, according to one embodiment there is therefore performed a Quality of Experience (QoE)-based optimization by taking into account both the physical/link information (e.g. channel quality, possible data rates, packet loss rate) and the application knowledge (e.g. user-perceived video quality). Reference is made in this connection to S. Khan, S. Duhovnikov, E. Steinbach, and W. Kellerer, "MOS-based multiuser multiapplication cross-layer optimization for mobile multimedia communication," Advances in Multimedia, 2007, article ID 94918.

According to one embodiment three rate shaping schemes are used in the network: transcoding, packet dropping and layer dropping. There has been investigated the impact of different schemes to the user-perceived video quality in order to arrive at some indicator which indicates the amount of quality degradation for the different rate shaping schemes. Rather than using a pixel-based distortion (e.g. calculating PSNR), in the investigation there has been used the video Structural SIMilarity (vSSIM) index (see e.g. Z. Wang, L. Lu, and A. C. Bovik, "Video Quality Assessment Based on Structural Distortion Measurement," IEEE Signal Processing: Image Communication. vol. 19, no. 1, pp. 121-132, February 2004) to measure the video quality. The vSSIM is a better measure than the PSNR, since human eyes are highly adapted to the structural information.

Figure 2:
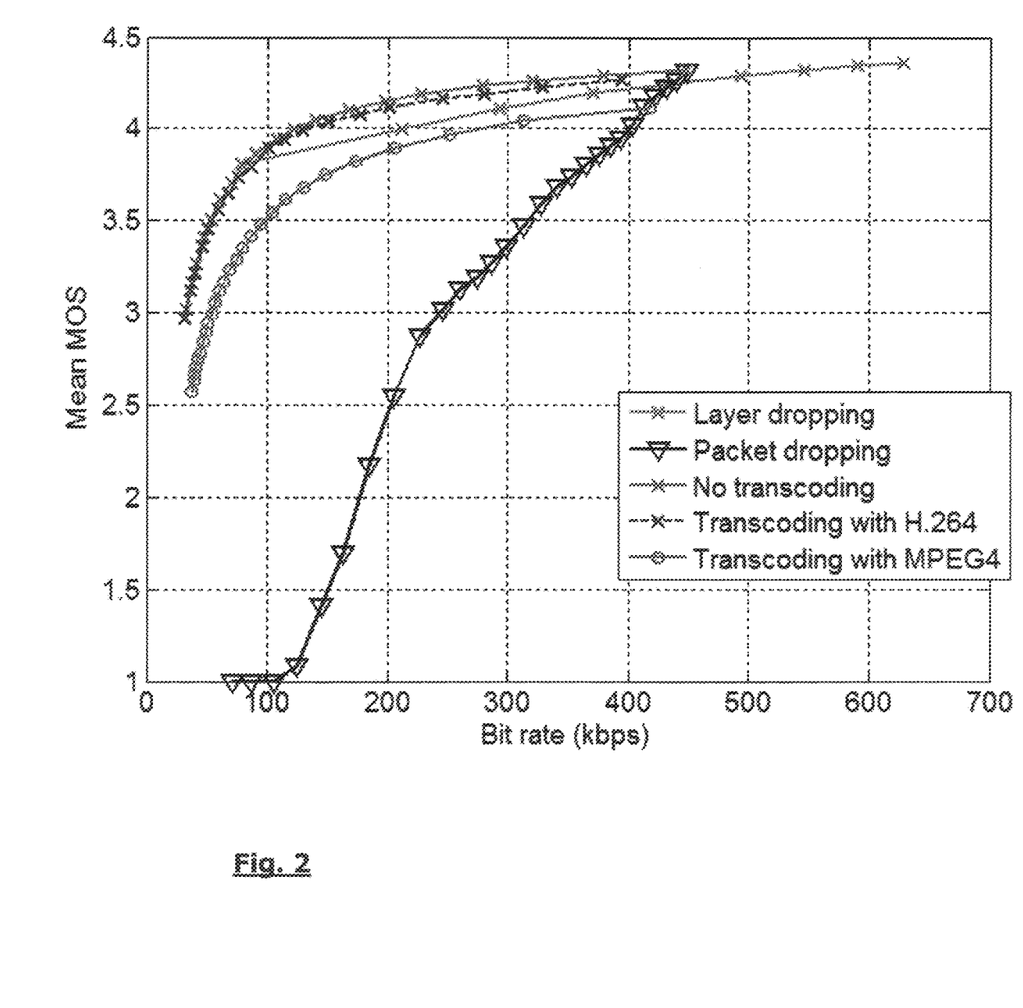
FIGS. 2 and 3 schematically illustrate the impact on quality of different rate shaping schemes.

It should, however, be noted that not only vSSIM but also other objective measurement of video quality (e.g. VQM) could in principle be used. As an example. FIG. 2 depicts an impact to the quality of an exemplary video (here a soccer video) when applying different rate shaping schemes. As can be seen from FIG. 2, transcoding to the same codec (e.g. from H.264 codec to H.264 codec but different quantizations for encoding) is a scheme that causes a minimal (almost no) impact to the video quality comparing to the transcoding to another codec. The graph is virtually identical to the original video without applying any rate shaping. On the other hand, there is a quality degradation when transcoding to another codec (e.g. H.264 codec to MPEG4 codec) as can be seen from FIG. 2. The most significant quality degradation results from applying the packet dropping, layer dropping on the other hand has less impact on the quality but still a higher impact than the transcoding.

Figure 3:
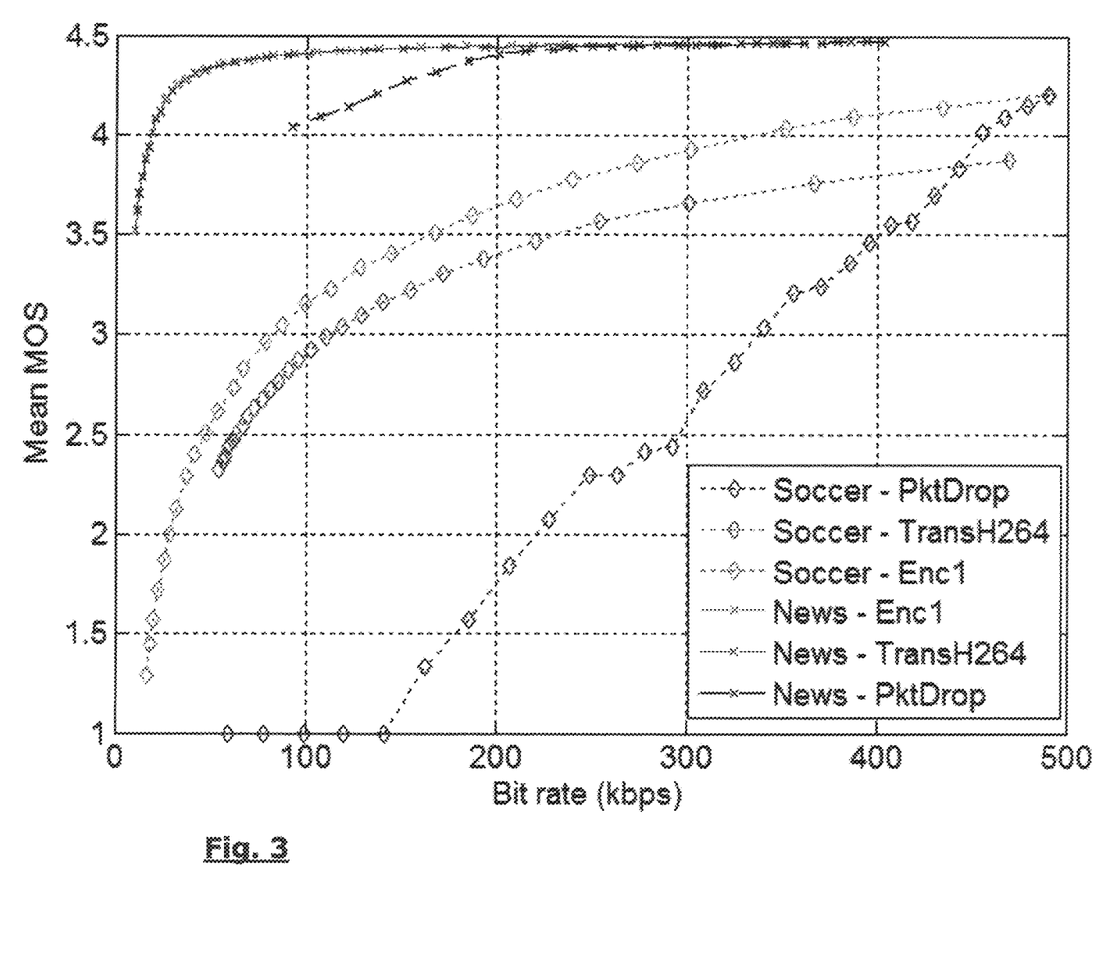

The impact on the quality of the different rate shaping schemes actually also depends on the content of the video. FIG. 3 shows a comparison of video quality degradation between transcoding and packet dropping for two different video contents, 'News' and 'Sport'. Here, End is the source distortion for the original video when it is encoded at different rates (without applying a rate shaping scheme), and in addition to that FIG. 3 shows the quality impact when applying transcoding (TransH264) and packet dropping (PktDrop).

From the comparison, it can be concluded that video content can be a considerable factor to be taken into account when performing a rate adaptation. As can be seen from FIG. 3, the transcoding has a very small impact for both streams. for the news stream actually the impact is almost zero, the two graphs for the original and the transcoded video actually cannot be distinguished in FIG. 3 (both start at MOS of about 3.5, then raising to about 4.5). For the soccer stream there is some (small) quality degradation, as can be seen from the graph starting at an MOS of about 2.3 and rising to about 3.8, while the original video has a MOS which is about 0.2 to 0.4 higher for the same bitrate. The packet dropping scheme however, has a significant impact on both streams, for the news video especially in the bitrate range from 100 to 200, for the soccer video for almost all bitrates except the very high ones over 400 kbps where then the MOS of the original and the packet dropping video differ by a MOS of 0.5 or less.

The knowledge about the impact on quality as illustrated in FIGS. 2 and 3 according to embodiments of the invention may then be applied to select which video stream should be transcoded or packet dropped or layer dropped, so that the overall quality perceived by all users served by the base station is maximized.

By applying the selection algorithm described before, the network operator can allocate the limited computational resources effectively, while keeping the customer satisfaction (or QoE) as high as possible. Simulation results show that indeed when applying the proposed algorithm to a HSDPA system including a QoE video framework the overall quality can be improved.

Figure 4:
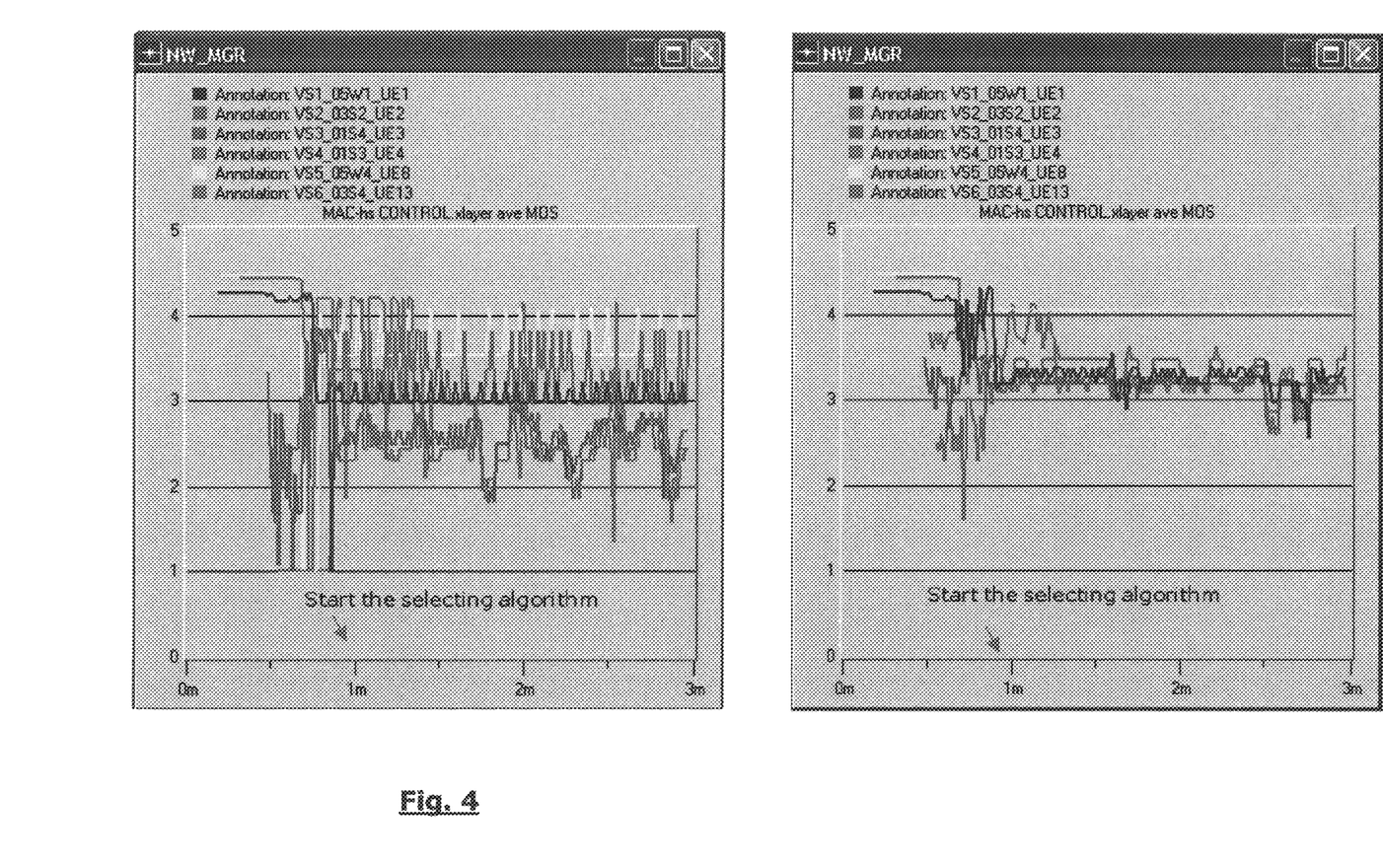
FIG. 4 shows a simulation result of an embodiment of the invention.

Such a simulation result is exemplarily shown in FIG. 4. In this example, there are 6 video streaming users with 5 different video contents, and the network can perform a transcoding to 3 video streams at maximum simultaneously, and the other rate shaping scheme is packet dropping. The left-hand part of FIG. 4 shows the case where the 3 video streams for which the packet dropping has the least significant degrading effect on quality are selected for transcoding, and the other videos are selected for packet dropping. As can be seen, after switching on the selection the quality fluctuates heavily and is unstable. On the other hand, the right-hand side of FIG. 4 shows the case where the video streams for which packet dropping would have the most severe degrading effect are selected for transcoding. As can be seen from FIG. 4, avoiding the packet dropping for these 3 streams has a significant improving effect on the overall quality, the quality is higher and more stable. Applying the proposed algorithm therefore results to an increasing of the perceived video quality of all users.

Figure 5:
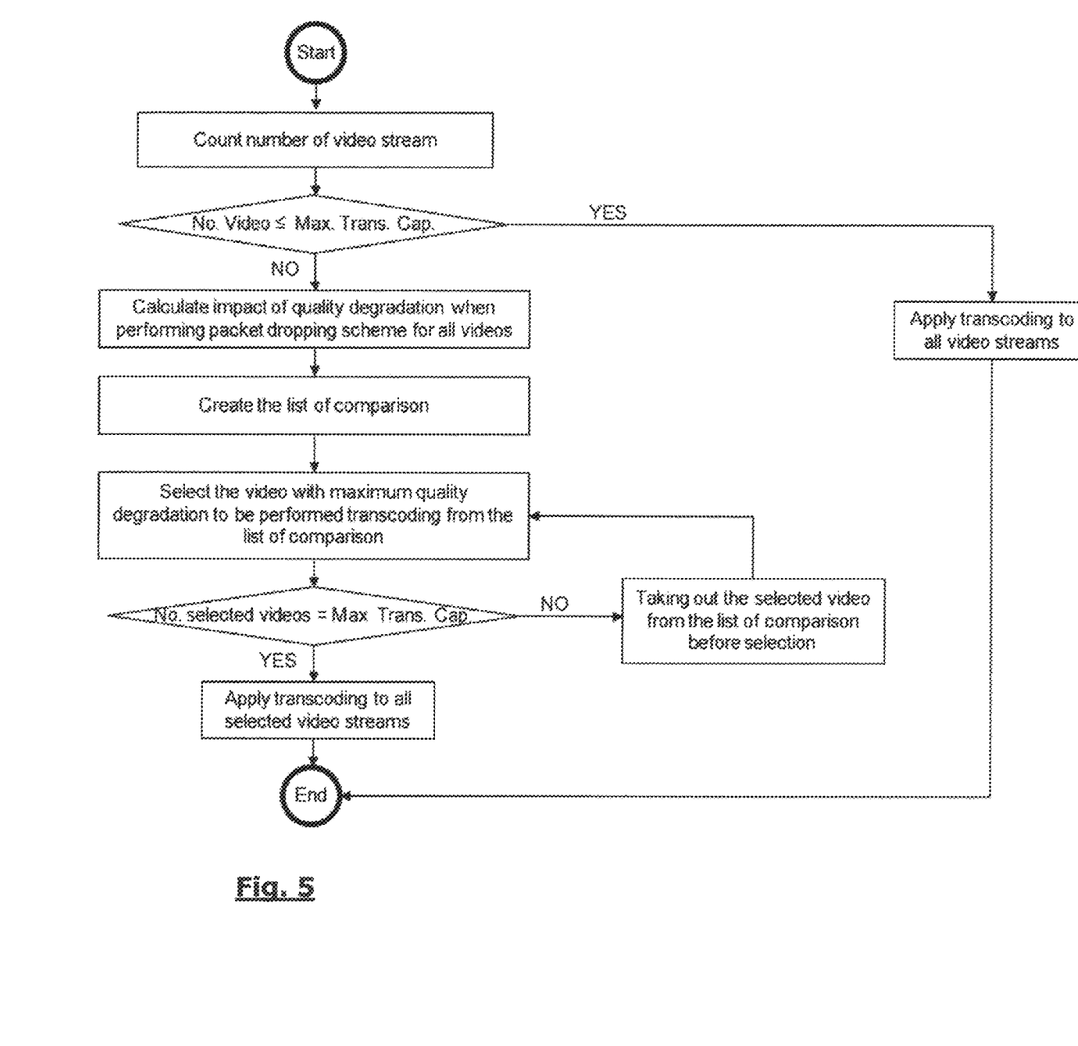
FIG. 5 shows a flowchart illustrating a rate shaping mechanism according to an embodiment of the invention.
Figure 6:
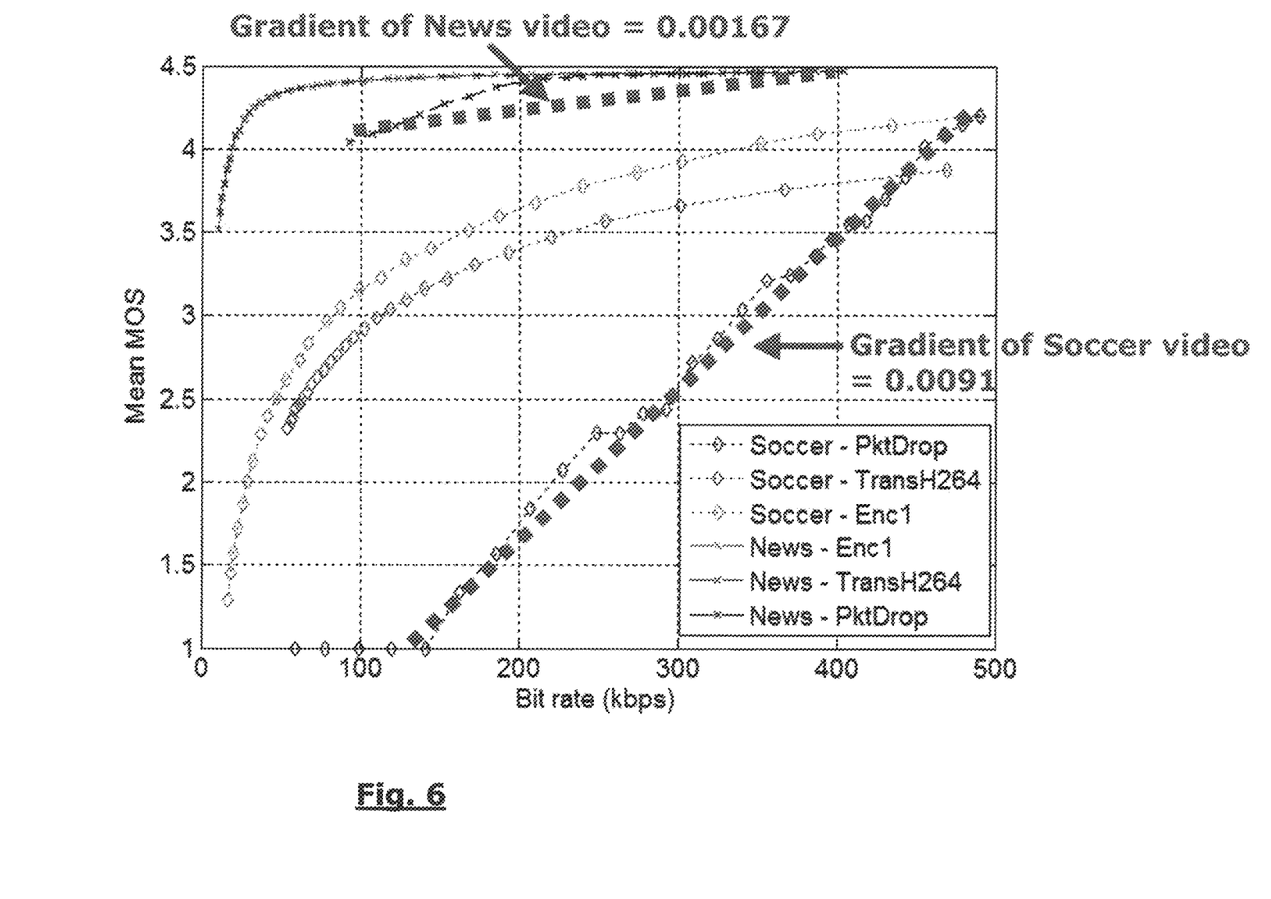
FIG. 6 illustrates a quality impact measure as used by a rate shaping mechanism according to an embodiment of the invention.

In the following the algorithm according to one embodiment will be described in somewhat more detail referring to FIG. 5. First, the algorithm checks whether the total number of video streams is less than the maximum transcoding capability (Max. Trans. Cap.). If that is the case, there is no need to perform the "intelligent" selection, but one may just apply transcoding to all video streams. Otherwise, the algorithm will have to calculate the impact of packet dropping to the video quality, for example, calculating the gradient of user perceived quality (MOS) over the data rate (as illustrated in FIG. 6 for example). The algorithm then selects or transcoding the video with maximum gradient (as this is the video where the non-optimum rate shaping scheme other than transcoding would have the most severe impact) and continues a selection loop until the number of selected videos is same as the maximum transcoding capability. In the last step, the algorithm then applies the transcoding to all selected videos.

The gradient of the quality versus bitrate for the different rate shaping schemes may have been measured in advance. Such a measurement may have been performed also for different contents, alternatively it may have been performed content-independent. The gradient then may be regarded as an indicator which indicates the impact on quality if the corresponding rate shaping scheme is selected.

The information about this impact (the gradient information) may for example be included in the video stream itself, and then the network may used this information when performing the rate adaptation to perform the selection. Alternatively the video may just carry some information about its content, and the gradient information indicating the impact on quality may be stored in advance in the network at some location (which may be the one performing the rate adaptation or a separate server or database), and then based on the content information the network (or the entity performing the rate shaping selection) may look up the gradient based on the content to then perform the selection algorithm based thereon.

Figure 7:
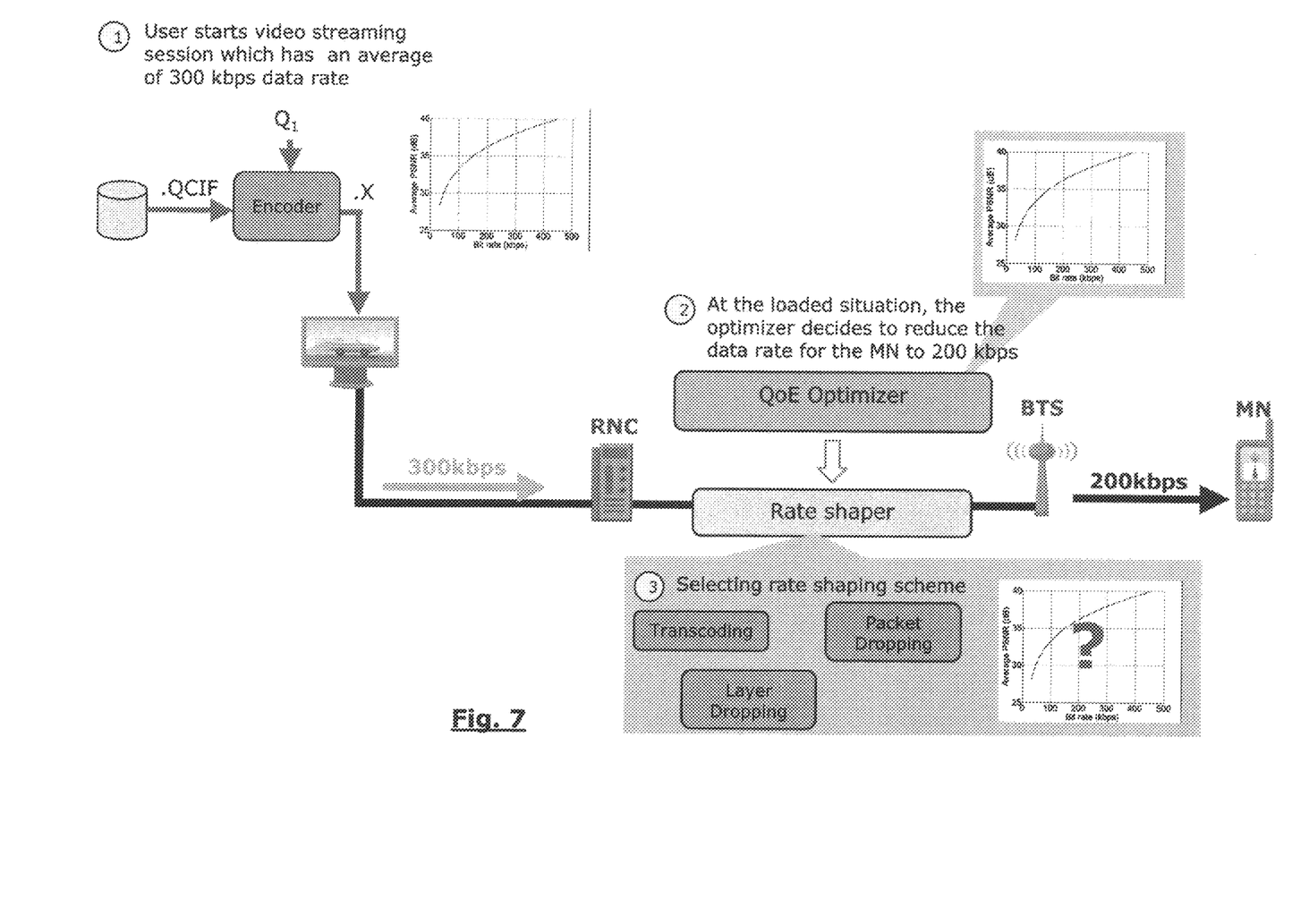
FIG. 7 schematically illustrates a mechanism according to an embodiment of the invention.

According to one embodiment, in practice the proposed algorithm could be implemented in the network, where the rate adaptation is required. Such a scenario is exemplarily shown in FIG. 7 which shows a situation where a session starts at a rate of 300 kbps (step 1 in FIG. 7) and has to be converted into a rate of 200 kbps. Such a decision is e.g. made by the QoE optimizing module shown in FIG. 7 (step 2 in FIG. 7) Then the rate shaping module has to select the rate shaping scheme to be applied among the available schemes, where in FIG. 7 transcoding, packet dropping and layer dropping are shown (step 3 in FIG. 7).

Figure 8:
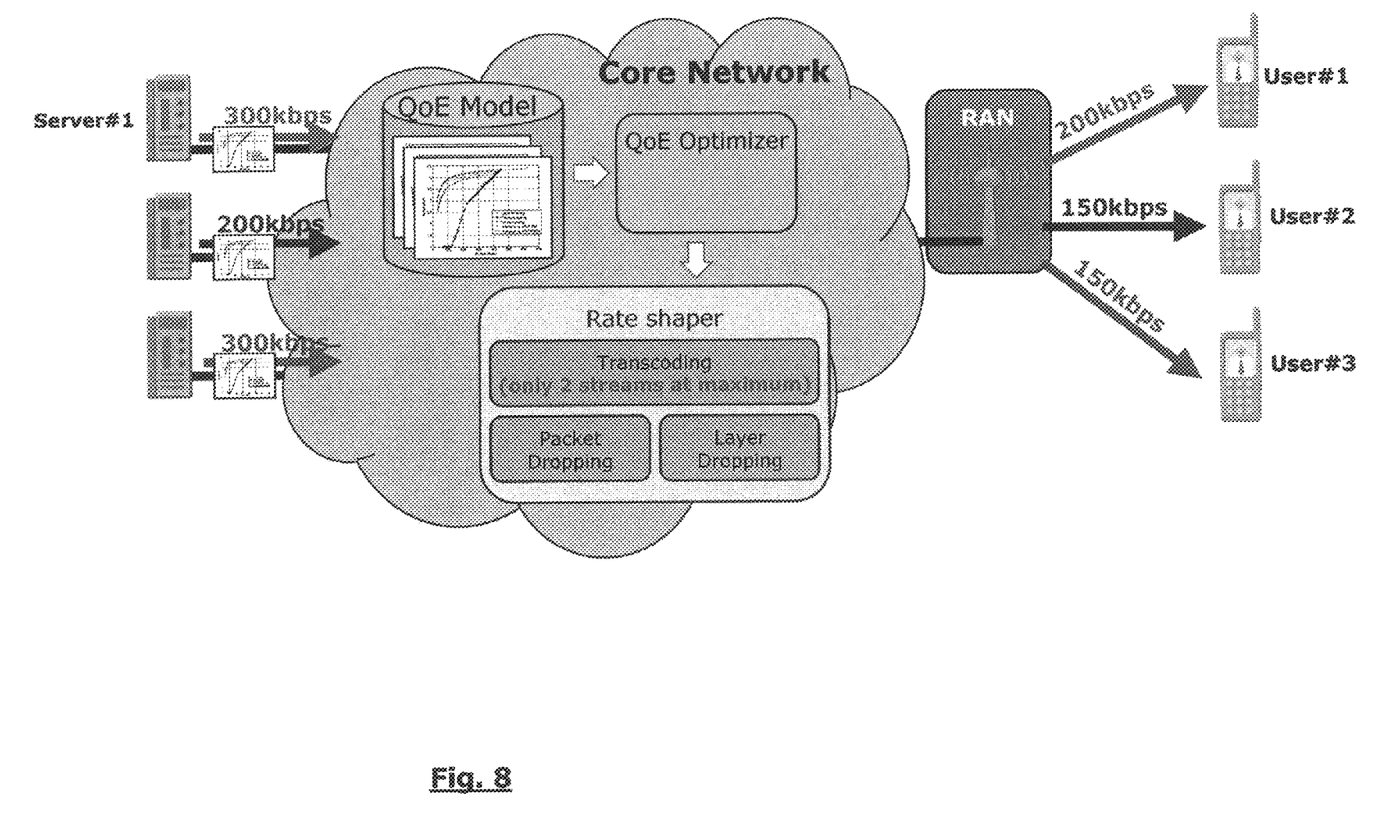
FIG. 8 schematically illustrates a mechanism according to a further embodiment of the invention.

A more concrete example according to one embodiment is shown in FIG. 8 where three streams are delivered by servers #1, #2 and #3, at respective rates of 300, 200, and 300 kbps. In the core network there is performed the rate shaping according to one embodiment which converts the three streams into rates of 200, 150, and 150 kbps respectively.

FIG. 8 illustrates a quality of experience (QoE) model which for the different video streams indicates the impact of the different rate shaping schemes on the video quality. This QoE model could be stored in advance in the core network (CN) or it could be signalled in the video stream. Based on this information the QoE optimizer then instructs the rate shaper which streams should be selected for the transcoding assuming that the computational resources are only sufficient to perform transcoding for two streams. For the third stream then packet dropping or layer dropping is used as rate shaping scheme in this embodiment.

It should be mentioned that according to the embodiments described so far the gradient of the quality (which serves as a measure of the impact of the rate shaping scheme selection on video quality) is has been used as a function of the bitrate. However, instead of a quality measure versus the bitrate also a quality measure versus the "fraction of resource allocation" could be used.

For that purpose one could use a quality model (QoE model) showing the quality degradation versus the fraction of resource allocation. The fraction of resource allocation is actually a function of data rate and the wireless channel quality. Therefore, if one knows the channel quality (as e.g. given by the channel quality indicator CQI) and the data rate giving a certain level of video quality (each point in the quality model figure), one can easily translate the data rate (x-axis in the quality model figure as shown in e.g. FIG. 2 or 3) to a fraction of resource allocation. With this alternative of a QoE model, the curves will then be updated based on the average channel quality of each mobile terminal. The mobile terminals may e.g. feed back the CQI to the network, and this information may then be used to update the quality (QoE) model. With such an embodiment the decision about the selection based on the QoE model would not only be based on the bitrate but instead on the actual condition of the network usage as indicated by the fraction of resource allocation which may be advantageous and may help in performing the optimization problem of resource allocation.

It will be understood by the skilled person that the embodiments described hereinbefore may be implemented by hardware, by software, or by a combination of software and hardware. The modules and functions described in connection with embodiments of the invention may be as a whole or in part implemented by microprocessors or computers which are suitably programmed and have suitable interfaces and peripherals so as to act in accordance with the methods or modules explained in connection with embodiments of the invention.

According to an embodiment of the invention there is provided a computer program, either stored in a data carrier or in some other way embodied by some physical means such as a recording medium or a transmission link which when being executed on a computer enables the computer to operate in accordance with the embodiments of the invention described hereinbefore.

What is claimed is:

1. A computer-implemented method for performing a rate shaping of multiple data streams which are to be transmitted through a network, said network having the capability to perform a rate shaping using a first rate shaping scheme and at least one other rate shaping scheme other than said first rate shaping scheme, wherein said first rate shaping scheme is a transcoding scheme and has a smaller impact on the quality of the data stream than said at least one other rate shaping scheme but requires more computational resources than said at least one other rate shaping scheme, said method comprising:
    determining based on the available computational resources of the network the maximum number n of data streams for which said first rate shaping scheme can be applied as a rate shaping scheme;
    selecting n data streams among the multiple data streams which are to be transmitted and performing a transcoding according to said first rate shaping scheme on them to perform a rate shaping;
    performing a rate shaping for other data streams among the multiple data s reams using said at least one other rate shaping scheme other than said first rate shaping scheme.

2. The method of claim 1, further comprising:
    determining for each of said multiple data streams a measure indicating how much the quality is degraded when the bit rate is changed based on the at least one other rate shaping scheme;
    selecting the n data streams for which said measure indicates the largest quality degradation as the ones for which the first rate shaping scheme is to be applied, and applying said at least one other rate shaping scheme to the remaining data streams of said multiple data streams.

3. The method of claim 2, wherein said measure indicating said quality degradation is determined in advance before the data stream is to be sent through said network, and said measure indicating said quality degradation is sent to said network together with said data stream to enable said network to select the appropriate rate shaping scheme for the individual data streams based thereon.

4. The method of claim 1, wherein if more than one rate shaping schemes other than said first rate shaping scheme are available in said network, said method comprises:
    determining for each of said multiple data streams a measure indicating how much the quality is degraded when the bit rate is respectively changed based on each of the more than one other rate shaping schemes; and
    for those data streams which are not selected for the first rate shaping scheme to be applied, selecting the rate shaping scheme among the more than one other rate shaping schemes based on their corresponding impact on the quality of the data streams such as to minimize said impact.

5. The method of claim 1, wherein said other rate shaping schemes comprise one or more of the following:
    packet dropping; layer dropping, and/or wherein said data streams are video data streams.

6. The method of claim 2, wherein said measure of said quality degradation is the gradient of a quality measure versus the bitrate or versus the fraction of resource allocation.

7. The method of claim 1, wherein said network stores a quality model indicating how much the quality of a certain data stream is degraded if a certain rate shaping scheme is applied, and the selection of the rate shaping scheme for a certain data stream is based on said quality model stored in said network.

8. An apparatus for performing a rate shaping of multiple data streams which are to be transmitted through a network, said network having the capability to perform a rate shaping using a first rate shaping scheme and at least one other rate shaping scheme other than said first rate shaping scheme, wherein said first rate shaping scheme is a transcoding scheme and has a smaller impact on the quality of the data stream than said at least one other rate shaping scheme but requires more computational resources than said at least one other rate shaping scheme, said apparatus comprising:
    a module for determining based on the available computational resources of the network the maximum number n of data streams for which said first rate shaping scheme can be applied as a rate shaping scheme;
    a module for selecting n data streams among the multiple data streams which are to be transmitted and performing a transcoding according to said first rate shaping scheme on them to perform a rate shaping;
    a module for performing a rate shaping for other data streams among the multiple data streams using said at least one other rate shaping scheme other than said first rate shaping scheme,
    wherein at least one of the modules is a hardware module.

9. The apparatus of claim 8, further comprising:
    a module for determining for each of said multiple data streams a measure indicating how much the quality is degraded when the bit rate is changed based on the at least one other rate shaping scheme;
    a module for selecting the n data streams for which said measure indicates the largest quality degradation as the ones for which the first rate shaping scheme is to be applied, and
    a module for applying said at least one other rate shaping scheme to the remaining data streams of said multiple data streams.

10. The apparatus of claim 9, wherein said measure indicating said quality degradation is determined in advance before the data stream is to be sent through said network, and said measure indicating said quality degradation is sent to said network together with said data stream to enable said network to select the appropriate rate shaping scheme for the individual data streams based thereon.

11. The apparatus of claim 8, wherein, said apparatus comprises:
    a module for, if more than one rate shaping schemes other than said first rate shaping scheme are available in said network, determining for each of said multiple data streams a measure indicating how much the quality is degraded when the bit rate is respectively changed based on each of the more than one other rate shaping schemes; and a module for selecting, for those data streams which are not selected for the first rate shaping scheme to be applied, the rate shaping scheme among the more than one other rate shaping schemes based on their corresponding impact on the quality of the data streams such as to minimize said impact.

12. A non-transitory computer readable medium comprising computer program code which when being executed on a computer enables said computer to carry out a method according to claim 1.

* * * * *